(12) United States Patent
Gibbs

(10) Patent No.: US 12,167,243 B2
(45) Date of Patent: *Dec. 10, 2024

(54) SYSTEM AND METHOD FOR ENCOUNTER IDENTITY VERIFICATION

(71) Applicant: Global Accountability Corp., Missoula, MT (US)

(72) Inventor: Theo Britton Gibbs, Missoula, MT (US)

(73) Assignee: Global Accountability Corp., Missoula, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/327,650

(22) Filed: Jun. 1, 2023

(65) Prior Publication Data
US 2023/0308881 A1 Sep. 28, 2023

Related U.S. Application Data

(63) Continuation of application No. 17/343,015, filed on Jun. 9, 2021, now Pat. No. 11,706,627.
(Continued)

(51) Int. Cl.
*H04W 12/50* (2021.01)
*G06F 21/62* (2013.01)
(Continued)

(52) U.S. Cl.
CPC ........ *H04W 12/50* (2021.01); *G06F 21/6245* (2013.01); *H04L 63/0892* (2013.01); *H04W 12/06* (2013.01); *H04W 12/65* (2021.01)

(58) Field of Classification Search
CPC ............. H04L 63/0861; H04L 63/0853; H04L 2209/56; H04L 9/3231; H04L 2209/805;
(Continued)

(56) References Cited

U.S. PATENT DOCUMENTS 7,522,056 B2 4/2009 Roque
10,187,754 B1 * 1/2019 Hansen ................. H04L 9/3297
(Continued)

OTHER PUBLICATIONS

International Preliminary Report on Patentability issued in International Application No. PCT/US2021/036629, mailed on Dec. 22, 2022, 8 pages.
(Continued)

*Primary Examiner* — Golam Sorowar
(74) *Attorney, Agent, or Firm* — Dorsey & Whitney LLP

(57) ABSTRACT

Systems and methods for verifying an identity of a first user involves receiving, at a server, a request from a communicatively coupled device of a second user to access information of the first user. The request includes information retrieved from a passive communication device associated with the first user and location information of the communicatively coupled device. In response, a location of an authenticated mobile device of the first user is determined, and when a location match is present, the identity of the first user is confirmed to the second user, and the second user is permitted to provide input into an account of the first user, such as for rating and reporting the performance of the first user. When a location match is not present, a message is transmitted to the second user indicating the identity of the first user is not confirmed and instructions provided to take action.

20 Claims, 3 Drawing Sheets

Related U.S. Application Data

(60) Provisional application No. 63/036,537, filed on Jun. 9, 2020.

(51) Int. Cl.
*H04L 9/40* (2022.01)
*H04W 12/06* (2021.01)
*H04W 12/65* (2021.01)

(58) Field of Classification Search
CPC ..... H04L 63/08; H04L 9/3271; H04L 63/083; H04L 63/10; H04L 63/102; H04L 9/32; H04L 63/0442; H04L 9/0891; H04L 9/3247; H04L 63/068; H04L 9/30; H04L 63/107; H04L 63/0838; H04L 67/306; H04L 9/0866; H04L 63/0876; H04L 63/0884; H04L 9/321; H04L 63/126; G06F 21/32; G06F 21/35; G06F 21/6245; G06F 21/34; G06F 2221/2115; G06F 21/31; G06F 21/44; G06F 2221/2111; G06F 2221/2129; G06F 21/45; G06F 2221/2105; G06F 21/60; G06F 21/6209; G06F 2221/2139; G06F 16/337; G06F 16/951; G06F 21/36; G06F 2221/2117; G06F 2221/2137; G06F 21/577; G06F 9/451; G06Q 20/40145; G06Q 20/385; G06Q 20/40; G06Q 20/3821; G06Q 30/06; G06Q 20/3676; G06Q 40/02; G06Q 20/3674; G06Q 20/382; G06Q 20/401; G06Q 20/20; G06Q 20/3276; G06Q 20/4012; G06Q 10/06; G06Q 10/10; G06Q 20/206; G06Q 20/3672; G06Q 50/22; G06Q 20/409; G06Q 20/42; H04W 12/06; H04W 12/068; H04W 12/03; H04W 4/029; H04W 12/68; H04W 4/80; H04W 4/023; H04W 12/63; H04W 88/02; H04W 12/64; H04W 12/47; H04W 12/33; H04W 12/77; H04W 4/08; H04W 4/33; H04W 12/084; H04W 12/65; H04W 12/065
See application file for complete search history.

(56) References Cited

U.S. PATENT DOCUMENTS

| | | | |
|---|---|---|---|
| 10,789,586 B2* | 9/2020 | Wilson | G06Q 20/10 |
| 2005/0011092 A1 | 1/2005 | Bruscini | |
| 2006/0267773 A1 | 11/2006 | Roque | |
| 2009/0284347 A1* | 11/2009 | Zimmerman | G06F 21/35 340/5.81 |
| 2014/0043141 A1* | 2/2014 | Cazanas | G07C 9/27 340/5.81 |
| 2014/0167963 A1 | 6/2014 | Ferragne | |
| 2016/0300189 A1 | 10/2016 | Ferreira De Souza et al. | |
| 2017/0126672 A1 | 5/2017 | Jang | |
| 2017/0324750 A1* | 11/2017 | Khan | H04W 12/068 |
| 2017/0357936 A1 | 12/2017 | Byington et al. | |
| 2018/0082304 A1 | 3/2018 | Summerlin et al. | |
| 2019/0028851 A1* | 1/2019 | Hansen | H04L 9/3236 |
| 2019/0156345 A1* | 5/2019 | Chen | G06Q 20/3226 |
| 2020/0213298 A1* | 7/2020 | Ericson | H04W 12/47 |
| 2021/0105265 A1 | 4/2021 | Yang et al. | |
| 2021/0385659 A1 | 12/2021 | Gibbs | |
| 2023/0216693 A1 | 7/2023 | Singh et al. | |

OTHER PUBLICATIONS

International Search Report and Written Opinion issued in International Application No. PCT/US2021/036629, mailed on Oct. 5, 2021, 9 pages.

Brand, Christiaan, et al., "Enabling Strong Authentication with WebAuthn", 5 pages, May 2018, Google Developers, retrieved from https://developers.google.com/web/updates/2018/05/webauthn.

International Search Report and Written Opinion issued in International Application No. PCT/US2024/035560, mailed on Sep. 17, 2024, 10 pages.

* cited by examiner

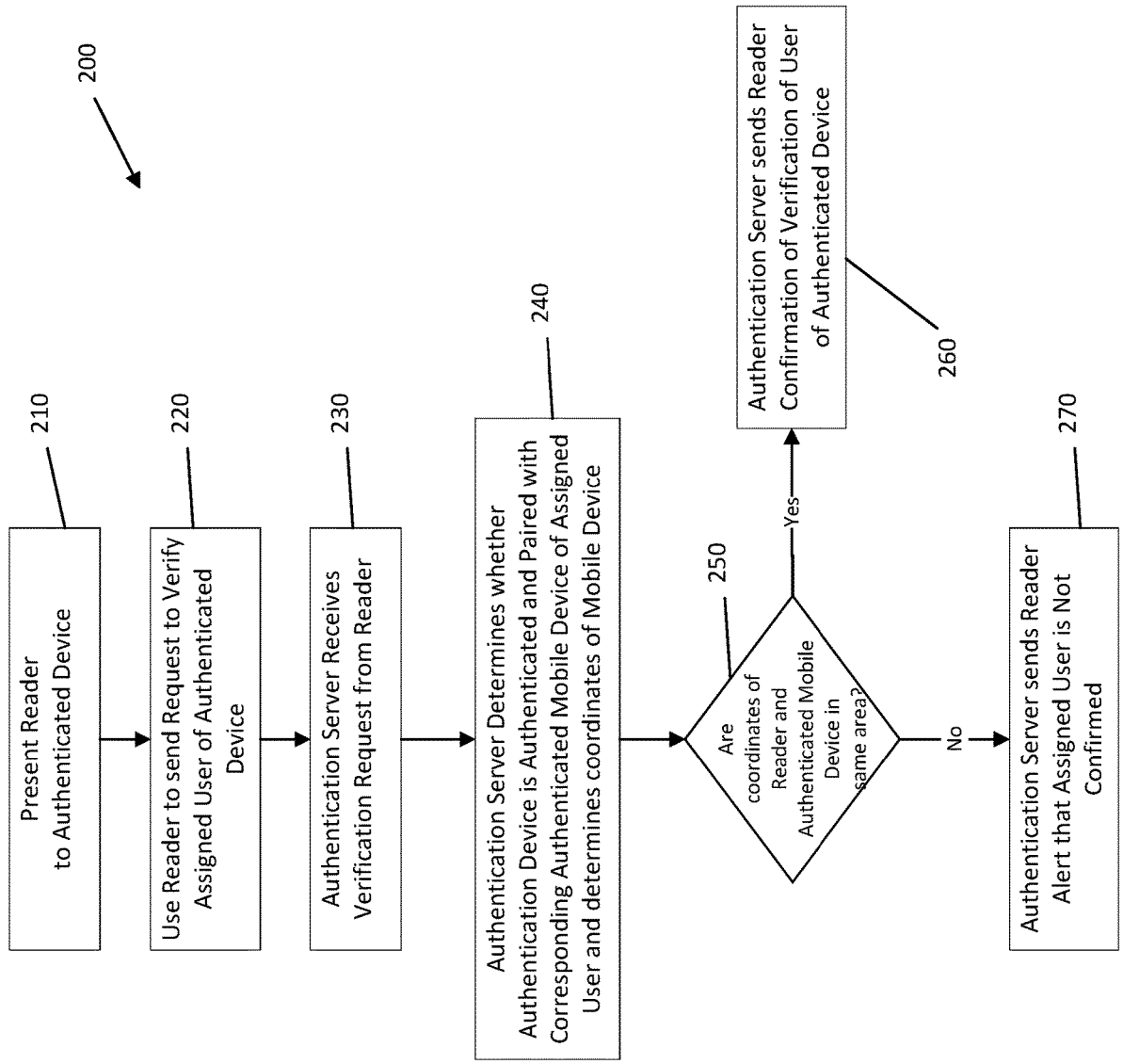

SYSTEM AND METHOD FOR ENCOUNTER IDENTITY VERIFICATION

CROSS-REFERENCE TO RELATED APPLICATIONS

This application claims priority to U.S. application Ser. No. 17/343,015 filed Jun. 9, 2021, issued as U.S. Pat. No. 11,706,627 on Jul. 18, 2023, entitled "SYSTEM AND METHOD FOR ENCOUNTER IDENTITY VERIFICATION" which in turn claims priority to U.S. Provisional Application No. 63/036,537 filed on Jun. 9, 2020, entitled "The Accountability Badge", the entire contents of which is incorporated by reference herein in its entirety.

TECHNICAL FIELD

Systems and methods for verifying a user of an authenticated device is an assigned user involve the use of electronic readers implemented over a network coupled to an authenticated mobile device of the assigned user.

BACKGROUND

The known related art of U.S. Pat. No. 7,522,056 issued on Apr. 21, 2009 to Roque discloses general means of attached an RFID device to a badge and use of the RFID device to track the location of the badge. Unfortunately, the prior art fails to provide means and methods of allowing second parties, such as members of the public to electronically interact with or about an enabled badge or person wearing an enabled badge. Events of recent years have facilitated the need for a tool the public can use to document their interactions with the police community.

The interaction between a police officer and a member of the public can be compared to an interaction between a customer and a provider of service; this paradigm is the primary assumption of this application, and as such this application can be employed to facilitate a number of other similar interactions between users.

SUMMARY

According to certain implementations, a method of verifying an identity of a first user in a computing system involves receiving, by a processing unit, a request from a communicatively coupled device to access information of a first user, where the request includes a first set of information retrieved from a passive communication device (e.g., a NFC chip held by the first user) and a second set of information related to the communicatively coupled device of a second user from which the request was sent. Based on the request, information of the first user retrieved from a memory coupled to the processing unit is transmitted for display. Input is received from the communicatively coupled device verifying the identity of the first user, and for at least one of ranking or reporting the first user. In response to receiving the input, a record of the first user is updated. In such implementations, the second user of the communicatively coupled device is different from the first user, and the passive communication device is a separate device from the communicatively coupled device.

According to alternative or additional implementations, a method of verifying an identity of a first user in a computing system involves, receiving, by a processing unit, a request from a communicatively coupled device to access information of a first user, where the request includes a first set of information retrieved from a passive communication device and a second set of information related to the communicatively coupled device from which the request was sent. The first set of information may include an identification of the first user of the passive communication device, and the second set of information may include a location of the communicatively coupled device. A location of an authenticated mobile device of the first user is received, where in such implementations, the authenticated mobile device and the passive communication device are separate devices from one another. The processing unit determines whether a location match is present between the location of the communicatively coupled device and the authenticated mobile device, and if so, a confirmation of the identity of the first user is transmitted for display and the second user of the communicatively coupled device is authorized to provide input into an account of the first user for storage in memory coupled to the processing unit. If a location match is not present, a message indicating the identity of the first user is not confirmed is transmitted for display, and instructions provided for the second user of the communicatively coupled device to take a secondary action.

In various implementations and alternatives, the passive communication device may be a Near Field Communication (NFC) device, and the communicatively coupled device may be a mobile phone including a chip reader and an internet browser.

In implementations, when a location match is present, the method further involves receiving secondary verification information of the first user from at least one of: the communicatively coupled device, the authenticated mobile device, or another device communicatively coupled to the processing unit. Such secondary verification information may include at least one of: voice verification information, biometric verification information, facial recognition information, or accelerometer verification information. A determination may be made of whether a secondary verification match is present between the received secondary information and information previously stored in an account of the first user. In such implementations, prior to the step of transmitting the confirmation of the identity of the first user, the secondary verification match may be determined to be present.

In implementations and alternatives, the instructions for taking the secondary action may include instructions for obtaining secondary verification information from the first user using at least one of: the communicatively coupled device, the authenticated mobile device, or another device communicatively coupled to the processing unit, and the method may further involve: receiving secondary verification information of the first user from at least one of the communicatively coupled device, the authenticated mobile device, or the other device communicatively coupled to the processing unit, where the secondary verification information comprises at least one of voice verification information, biometric verification information, facial recognition information, or accelerometer verification information; and determining whether a secondary verification match is present between the received secondary information and information previously stored in an account of the first user. In such implementations, when a secondary verification match is not present, the method further comprises: contacting one or more of a peacekeeping authority or a supervisor of a user assigned to the passive communication device; providing the location of the communicatively coupled device to the one or more of the peacekeeping authority or the supervisor; and notifying the communicatively coupled device of the steps of contacting and providing. In such implementations, when the processing unit determines a secondary verification match is present, the method further comprises: transmitting for display a confirmation of the identity of the first user, and authorizing the second user of the communicatively coupled device to provide input into an account of the first user for storage in memory coupled to the processing unit.

In implementations and alternatives, the instructions for taking the secondary action may include instructions for contacting a peacekeeping authority or a supervisor of a user assigned to the passive communication device, and the method may further involve the processor taking the described contacting, providing and notifying steps. In addition or alternatively, the second set of information may include a timestamp associated with the location of the communicatively coupled device, and the method may further include the step of: retrieving a timestamp of the location of the authenticated mobile device of the first user. The transmitted confirmation of the identity of the first user may include at least one of a badge number, a photograph, a name, a gender, an employment location, or an activity status of the first user.

BRIEF DESCRIPTION OF THE DRAWINGS

FIG. 2 depicts a method of verifying a first user of an authenticated device during an encounter with a second user in possession of a reader, according to the present disclosure.

DETAILED DESCRIPTION

Systems and methods for verifying a user of an authenticated device are disclosed herein. Certain details are set forth below to provide a sufficient understanding of embodiments of the disclosure. However, embodiments of the disclosure may be practiced without these particular details. Moreover, the particular embodiments are provided by way of example and should not be construed as limiting. In other instances, well-known circuits, control signals, timing protocols, and software operations have not been shown in detail to avoid unnecessarily obscuring the disclosed embodiments.

Disclosed embodiments generally relate to verification of an assigned user of an authenticated device. Briefly, verification includes verifying an assigned user is in possession of an authenticated device using a reader possessed by a second user, such as a member of the public during an encounter with a police officer in possession of the authenticated device that enables members of the public to verify the identity of the police officer. In response to verification, the second user may access information about the assigned user (i.e., a first user when the first user's identity is verified) and may interact with features system that may enable the second user to provide feedback about the encounter, such as by rating and reporting the performance of the assigned user.

In a more specific implementation, electronic signaling technology may be integrated into a badge or other object worn or carried by a first user, and such electronic signaling technology may be used with other computer applications to allow second users to:

1. Learn and verify the identity of a badge wearer;
2. Obtain contact information and supervisor pertaining to the badge wearer;
3. Rate, comment upon or otherwise lodge opinions or factual information regarding the observed conduct of a badge wearer;
4. Provide accountability to the public for the conduct of the badge wearer;
5. Provide a history of conduct or longitudinal study of public commentary and/or complaints regarding the badge wearer; and
6. Access contacts and resources provided by the badge wearer.

Figure 1A:
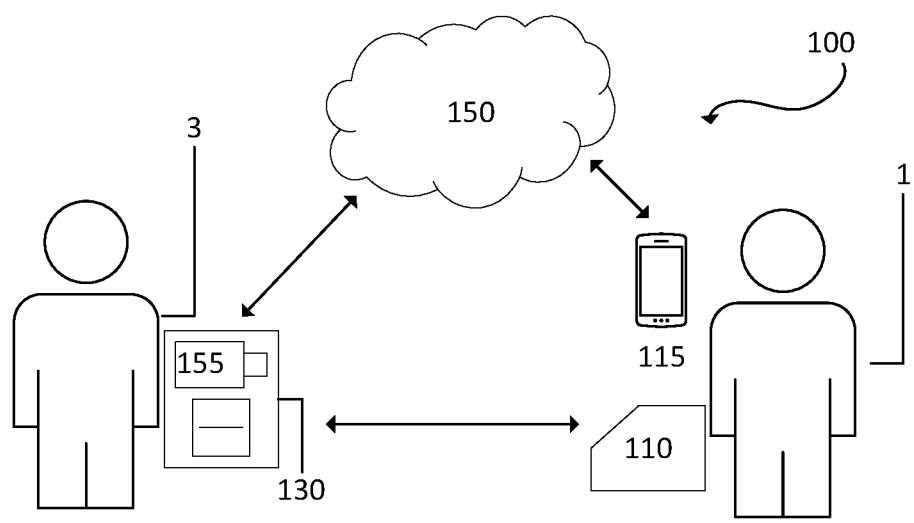
FIG. 1A is a schematic diagram illustrating a portion of a networking environment according to the present disclosure.

Turning to FIG. 1A, in many cases a first user of an authenticated device may require verification, for instance, during an encounter between a person purporting to have authority (e.g., a police officer) and a member of the public. The person may be referred to herein as a first user 1 and may be an assigned user of an authenticated device 110 (e.g., NFC chip affixed to a card or badge), and the member of the public may be referred to herein as a second user 3, who may present a reader 130 in close proximity to the authenticated device 110 to verify the first user is the assigned user of the authenticated device 110. The reader 130 may be a mobile phone configured to receive data from NFC chips along with other functions customary to mobile phones including receiving wireless communications, which may also include a web browser and camera. Upon sensing the authenticated device 110 using the reader 130, the mobile phone may send the information received from the authenticated device 110 to a server 150 of the network 100, and the server 150 may return a message or provide access to the website with account information 155 about the assigned user of the authenticated device 110. The second user 3 may determine that the first user 1 is the assigned user of the authenticated device 100 for instance by comparing a photograph or badge information displayed on a screen of the reader 130 to the person 1 holding the authenticated device 110 and purporting to be the assigned user. Alternatively, the second user 3 may determine that the first user 1 is not the same person as identified in the reader 130 and may take further action, such as requesting assistance from others including via the network 100.

According to the present disclosure, verification may further involve one or more electronic verification steps including electronically confirming the location where the first and second user are present is the same, and using the network 100 to perform additional identity verification steps to confirm the first user 1 holding the authenticated device 110 is the assigned user. Such additional verification steps may involve the first user interacting with an authenticated mobile device 115 of the assigned user (e.g., due to the assigned user and first user being the same person according to the present disclosure). In such implementations, the authenticated mobile device 115 is a separate device from the authenticated device 110, and both devices 110, 115 are associated with a single assigned user at a given time or timeframe (e.g., during an officer's shift), according to the present disclosure.

Embodiments of the present disclosure further generally relate to expanding the capabilities of passive devices such as near field communication NFC chips (e.g., NTAG-213, NTAG-215) that may be provided as the authenticated device of the present disclosure. While NFC chips may typically be used to provide limited information to a reader, the present disclosure enables the information to be used in connection with identity verification and instigating secure data collection.

Figure 1B:
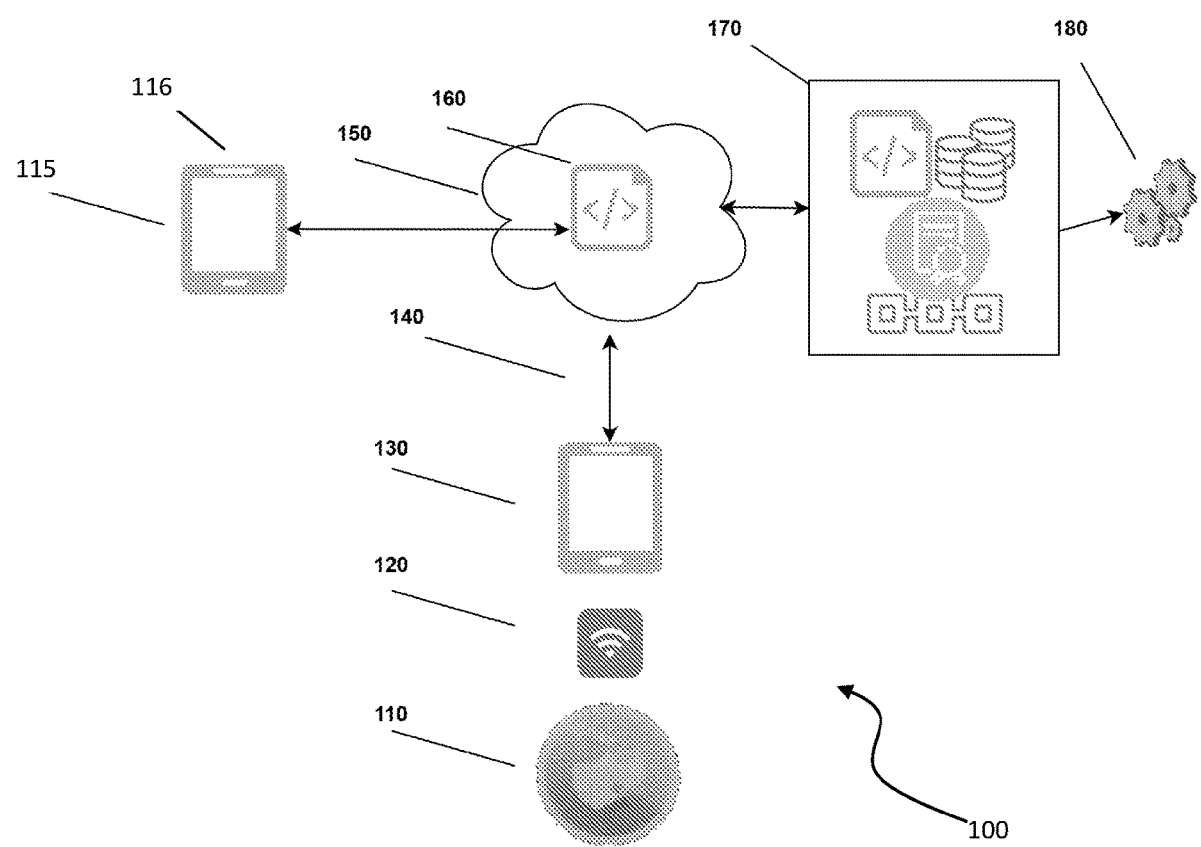
FIG. 1B illustrates a network configured to verify a first user of an authenticated device during an encounter with a second user in possession of a sensor, according to the present disclosure.

FIG. 1B illustrates a network 100 configured to verify a first user of an authenticated device during an encounter with a second user in possession of a sensor according to the present disclosure. In FIG. 1B, the network 100 includes an authenticated device 110 illustrated as a NFC chip configured with NFC communication capabilities, an authenticated mobile device 115 and its associated reader 116 when present, a signal 120 transmitted by a reader 130, data 140 transmitted by the reader 130 to a server 150 that may implement a host application 160, a data processing layer 170 and data analytics 180.

With respect to the authenticated device 110, which may be implemented as a passive communication device such as a NFC chip. The authenticated device 110 may be configured to provide secured forms of data exchange between the authenticated device 110, an application (e.g., hosted by the server 150), and the reader 130. The passive communication device may store data thereon such as a website address (URL) or information about the assigned user of the authenticated device. For instance, the passive communication device configured as an authenticated device 110 may also store the assigned user's badge or registration number, precinct location, name, gender, and other credentials related to the assigned user such as number of years of service, past ratings by other second users, and so on. In addition, the website address stored in the authenticated device 110 may include this as well as additional information.

The authenticated device 110 may be embedded in or placed on an object including a portable card (e.g., PVC card), a badge (e.g. a police badge), or an appliance that can be easily carried by the first user of the authenticated device 110. The object to or on which the authenticated device 110 is associated may not include other computer or communication components, and the object and authenticated device 110 may only be configured as having passive data transmission capabilities. Accordingly, as provided herein, the first user of the authenticated device 110 may present their authenticated device 110 to other devices carrying readers 130 described herein, such as a member of the public carrying a mobile phone having a preinstalled reader 130, to implement the verification processes of the present disclosure. The authenticated device 110 being limited in size and data transmission capabilities provides benefits due to it being easily portable and storable. This enables the first user of the authenticated device 110 to present it only when needed, and may enable the first user to engage with others, e.g., with members of the public as second users, more easily compared to when a larger or less portable CPU-type device is used for initial verification.

The authenticated device 110 may be assigned to a user through an enrollment process in which the user establishes a user account with the network 100, which may be managed or authorized for use by the assigned user's employer (e.g., police precinct, security company, governmental agency, armed forces, etc.). For instance, prior to authentication of the authenticated device 110, the object on which the device 110 is affixed may be scanned into the network 100 and entered into the assigned user's profile stored on the network 100. In addition or alternatively, a unique identification number of the authenticated device 110 may be assigned to the assigned user's profile. When data on the authenticated device 110 is accessed, the assigned user's profile, or public portions thereof, may be visible on a website and accessible to a second user, as provided further herein.

The authenticated mobile device 115 and its associated reader 116 may be a cellular phone, a body camera, and/or may additionally include camera, microphone, GPS, accelerometer, as well as other functionalities common to cellular phones and frequently used by assigned users serving as first users 1 such as officers, security guards or government service persons and may be used in connection with verification of their assigned user status. Alternatively, the authenticated mobile device 115 may be communicatively coupled to one or more devices having reader 116, a cellular phone, a camera, a microphone, a browser, and accelerometer functionalities.

In aspects of the present disclosure, a signal 120 is transmitted by a reader 130 of the second user 3 to the authenticated device 110 of the first user 1, and the authenticated device 110 transmits the stored data contained therein back to the reader 130, which transmitted data may be used in connection with verifying the first user of the authenticated device 110 as an assigned user. This verification process is disclosed in connection with a direct encounter (e.g., person-to-person encounter in the same location at the same time) between a member of the public in possession of a reader 130 and an officer (e.g., the assigned user) in possession of the authenticated device 110. However, it will be appreciated that verification of assigned users may be useful in other contexts where verification of the identity of a person is important during a direct encounter with others.

The reader 130 may be a mobile device that is possessed by a second user and such user may not be enrolled in the system 100, e.g., the second user of the reader 130 may not have a user account in the system 100 and may be unfamiliar with the first user, and further, may be unfamiliar with the assigned user of the authenticated device 110 if not the same as the first user. For instance, the second user member of the public and the first user purporting to be the assigned user may be strangers to each other, and thus the systems and methods of the present disclosure may be used in connection with the second user receiving electronic confirmation that a first user, that is otherwise a stranger, is an assigned user of the authenticated device 110, thus enabling electronic confirmation that the first user is an assigned user and is thus who they say they are.

The reader 130 broadly may be configured as an electronic chip reader (e.g., NFC chip reader) and may include a processing unit, memory, wireless communication capabilities and a web browser. The reader 130 may be a cellular phone and/or may additionally include camera, microphone, GPS, accelerometer, as well as other functionalities common to cellular phones and frequently used by members of the public. Alternatively, the reader 130 may be communicatively coupled to a device having cellular phone, camera, microphone, browser, and accelerometer functionalities.

When the reader 130 is configured as an electronic chip reader (e.g., NFC chip reader), the reader 130 may be configured to receive information from chips having passive data transmission capabilities. In some implementations, the reader 130 may be contactless with the authenticated device 110. The reader 130 may supply power to the authenticated device 110, e.g., to an unpowered NFC chip or other passive communication device. The reader 130 may receive from the authenticated device 110 stored information, for instance using near field communication protocol and may operate on the 13.56 MHz frequency. The reader may receive information from the authenticated device 110, for instance, when the authenticated device 110 is within about 1 inch to 3 feet away from the reader 130, e.g., about 0.5 to 2.5 in., or 2 in. or less. Although examples use an NFC chip as the authenticated device, implementations may use other devices for transmission of information to a reader, and for instance, a web address generated by a QR code stored on the authenticated device 110 may be sensed, or the web address printed on the object may be directly entered into a web browser of the device carrying the reader 130. When the reader 130 is a component of a mobile phone or other mobile device, the device may be configured to receive wireless communications, and may also include a web browser, GPS functionality, a camera, a microphone, and an accelerometer. Alternatively, the reader 130 may include features of a mobile phone but may not be a mobile phone. In response to receiving or reading information via the reader 130, the device carrying the reader 130 may initiate certain of its features including the web browser, the camera, the microphone and/or the accelerometer. In addition or alternatively, the mobile phone may send a push notification to the second user requesting one or more of these features be activated.

Upon the reader 130 accessing the data on the authenticated device 110, the reader 130 may send data 140 to a server 150 or other host. For instance, the reader 130 may display and send the accessed data directly to the server 150 or may transmit the data 140 to the server 150 through a web browser or native application. The data 140 may be transmitted through wired or wireless technologies including but not limited to cellular networks, wireless home networks, or Ethernet LAN. The data 140 may be transmitted bidirectionally and its contents may be dependent on the requirements of the transaction being processed.

Data 140 transmitted by the device carrying the reader 130 may include but is not limited to data which is voluntarily transmitted by the second user such as the devices sensor data (e.g., accelerometer, gyroscopic, camera, microphone, GPS (location), etc.) and web form input, or data which is involuntarily transmitted from the second user's device such as the time of the interaction and the origin of the NFC chip transaction (e.g., for purposes of validating the origin).

The server 150 may host the application 160 accessed by the second user via the reader 130. In FIG. 1B, the server 150 may be implemented as a virtual private cloud (or similar web server solution). The server 150 may include one or more processing units, computer readable media and storage. The term computer readable media is used to refer to a single computer readable medium in some embodiments, and in other embodiments multiple computer readable media in communication with one or more processing units. The computer readable media and/or storage may include any form of computer readable storage or computer readable memory, transitory or non-transitory, including but not limited to, externally or internally attached hard disk drives, solid-state storage, tiered storage solutions, storage area networks, network attached storage, and/or optical storage. As provided herein, the instructions stored on the computer readable media may be executed on the one or more processing units or other processing units of the server 150. The server 150 may maintain, update, and create user accounts for first users enrolled in the network 100, and for instance may be a server 150 operated by a peacekeeping authority or a municipality. For instance, the server 150 may be operated by a police station and may operate as a police station's officer monitoring system, or server 150 may be communicatively coupled to such monitoring systems. In this example, the server 150 may store or be communicatively coupled to body camera data streams of body cameras worn by officers while on duty. In such implementations, when a first user 1 is on duty and wearing a camera, the footage of an encounter may be timestamped and such footage and timestamping may be uploaded to the server 150 and/or to systems communicatively coupled to the network 100. Timestamps of the camera footage may be used, for instance, in connection with determining the first user is an assigned user of the authenticated device 110. In some implementations, a body camera may be configured as an authenticated mobile device 115 provided herein. When using a body camera in connection with the present disclosure, a timestamp at the start of an encounter, and a timestamp at the end of the encounter may be identified, and footage of the camera during an associated timeframe may be stored in the server 150 for use in authentication and/or for use in the data processing layer 170 described herein. In some implementations, the camera may not be network enabled and may be used for instance, in post-encounter analyses, while in other implementations, the camera may be coupled to the network 100 such that information may be received into the network 100 from the camera in real-time. When network enabled, for instance, the camera may transmit information wirelessly such as by being connected to a patrol car computer by Bluetooth.

The application 160 may be configured as a web or native application powered by the server 150. The application may contain scripts that transmit data between the device components associated with the reader 130 (e.g., the web interface of the mobile phone carrying the reader 130) and the data solution. The data solution may include but is not limited to another application, blockchain technology, or a backend server script using a database technology.

According to implementations, the server 150 and host application 160 may be communicatively coupled to a data processing layer 170, which may include but are not limited to processing solutions including business scripts that receive the data transmitted from the host application 160, decrypts the data and validates the origin of the NFC chip scan. The script may then retrieve a assigned user's information from a storage solution such as a database or blockchain network where the account information of the assigned user of the authenticated device 110 is stored.

The server 150 may implement data analytics 180, which may be performed on the data processing layer 170. Data analytics may be performed on the data stored in the data processing layer, which may occur independently of the interaction that created it, e.g., independently of the reader 130 sending data to the server 150. For instance, analysis of the data may be performed to generate statistics used to improve or promote the product, offer meaningful insight into the larger group of interactions generated by the NFC chip transaction, or any other purposes that do not violate the EULA of the public application. Analysis of the data may be performed by an entity such as a data analyst or neural network.

Turning to FIG. 2, method 200 is provided for verifying a first user of an authenticated device 110 is an assigned user during an encounter with a second user in possession of a reader 130. An assigned user may be, for instance, a police officer, a peace officer, a trained person, an individual authorized to interface with members of the public, or another person where identify verification may be necessary. According to method 200, the method may start in step 210, where the second user 3 presents a reader 130 in close proximity to the authenticated device 110 held by the first user 1, such as an officer or person purporting to be the officer during a direct encounter. Since the readers 130 of the present disclosure are commonly pre-installed on mobile devices, e.g., cellular phones, and such devices typically include a web browser and camera functionality, extra installation of an application on the mobile device may be unnecessary. In other words, the mobile device typically supplied with a preinstalled reader 130, camera, and web browser may be used to execute implementations of the present disclosure by the second user. Thus, an application (e.g., "app") or a separate browser installation and additional time and expense for the second user may be avoided in order to proceed with method 200, according to the present disclosure.

Upon the reader 130 receiving data from the authenticated device 110 in step 210, the method proceeds to step 220 in which the reader 130 sends a request to the server 150 to verify the authenticated device 110. The request may include the received or sensed information from the authenticated device 110 and the request may be accompanied by location information of the reader 130. The location may be time-stamped, for instance, with the time the reader 130 engaged with the authenticated device 110 in step 210. The location may be provided as GPS coordinates of the reader 130, as a location on a map as determined by components carrying the reader, or by other location identification approaches using a CPU and/or GPS hardware and software of the reader 130. The request may be sent over a wireless network, such as a cellular network, a wireless local area network, a wireless metropolitan area network, a wireless personal area network, or a wireless wide area network, as well as other communication networks as will be understood by those skilled in the art.

At step 230, the server 150 receives the verification request. The server 150 may be implemented over a distributed network. The server 150 may perform initial request validation steps validates to determine the origin of the scan by, for example, running a decryption algorithm on the information sent to the server. If valid, the information may be transmitted to a data processing solution where a script will timestamp the interaction and collect associated records from a data storage solution such as a database or a blockchain network and return the collected records as provided herein.

Upon receipt of the verification request from step 230, the server at step 240 may determine whether the authenticated device 110 is activated or currently authenticated, and may determine whether the assigned user's authenticated mobile device 115 is active and/or paired with the authenticated device 110 and the same location as the reader 130 and, in some implementations, at the same time (e.g., during the time of the encounter between the users).

For determining whether the authenticated device 110 is activated or currently authenticated, the first user may be required to scan the authenticated device 110 using their authenticated mobile device 115 before the authenticated device 110 can be used to verify the first user's identity. This scan may be required prior to the start of the second user's verification process, such as scanning the authenticated device 110 at the start of the first user's shift, or scanning just prior to the second user scanning with the reader 130. Such an approach may facilitate ensuring that the first user's information can't be accessed while inactive, e.g., off duty, and may help ensure the authenticated device 110 cannot be used by an unauthorized user (e.g., an imposter).

The location of the authenticated mobile device 115 may be determined by the server 150 automatically, e.g., when location tracking is active on the authenticated mobile device 115, or the server may send a request to the authenticated mobile device 115 to receive location information. Location information may be timestamped for instance with the time the authenticated mobile device 115 sent the location information to the server 150. The location may be provided as GPS coordinates, or as a location on a map, or by other approaches as determined by components of the authenticated mobile device 115 (e.g., the CPU and GPS hardware and software of a mobile phone or of a network enabled body camera).

In implementations, the action of the reader 130 requesting identify verification of the first user in possession of the authenticated device 110 at step 230, sends the request over network 100, which may trigger the server 150 to send either: a push notification (if the authenticated mobile device 115 is implemented as a native application downloaded on the device), a text alert, or an email containing a link to our site. In the case of the authenticated mobile device 115 implements a native application, the application may prompt the first user to authenticate themselves, e.g., via secondary verification, by either a stored authentication method on the device (such as facial recognition, fingerprint, phone pin), or use an external source such as a previously captured voice profile. In the case of the authenticated mobile device 115 not being including a native application, the first user may receive either an email or text with a link to our site. Upon clicking the link reader the authenticated mobile device 115 may prompt the first user to authenticate themselves using methods described herein. Alternatively, the authenticated mobile device 115 and the reader 130 may communicate with each other, for instance, upon the network 100 verifying the identity of the first user.

Pairing of the devices 110, 115 may involve the first user logging into the system 100 to confirm the first user has both devices 110, 115 in their possession. This pairing step may optionally be performed and may be useful when the system 100 tracks the activity of the first user, for instance, for clocking-in in an employment setting to indicate the first user has started their shift or certify they are on duty. In addition or alternatively, pairing of the devices 110, 115 may involve the first user scanning the authenticated device 110 using the reader 116 of the authenticated mobile device 115. The reader 116 may be configured the same as the reader 130 of the present disclosure and may be a component of the authenticated mobile device 115.

At step 250, the server determines whether the first user 1 holding the authenticated device 110 is in the same location as the second user 3 holding the reader 130, by comparing a location of the reader 130 to a location of the authenticated mobile device 115. When the devices 115 and 130 are in the same location, e.g., within 0 to 500 feet of each other, the server 150 may confirm first user of the authenticated device 110 is the assigned user (e.g., the first user is who they say they are) or determines the first user is not verified based on the location information. In addition, the server 150 may determine whether the location information includes timestamps within a timeframe corresponding to the encounter between the first and second users, such as within 1 second to 5 minutes of each other.

While the authenticated device 110 is a separate device from the authenticated mobile device 115, when the first user 1 is an assigned user, this person would typically carry both of these devices 110, 115, or these would be in close proximity to each other and to the first user 1. As a result, determining the location of the authenticated mobile device 115 and comparing this location with the location of the reader 130 held by the second user 3 is used as verification step for verifying the first user of the authenticated device 110 is an assigned user according to the present disclosure. Such approaches may be used with or without timestamp verification.

In additional or alternative implementations, step 250 may involve the server 150 sending instructions to the reader 130 and/or to the authenticated mobile device 115 of the assigned user to perform secondary verification steps beyond location verification and timestamp verification. For instance, one or more modes of verification may be requested by the second user, by the first user and/or by the server. Examples of such verification may include voice verification, biometric verification such as finger printing, facial recognition, or accelerometer verification.

Voice verification may involve the first user providing a pass phrase, such as "license and registration", at the reader 130, the authenticated mobile device 115, or another device communicatively coupled to the server 150, and the recited pass phrase may be transmitted to the server where it is compared with a previously stored voice profile stored in the assigned user's profile. For instance, a web interface of the device carrying the reader, via the server 150, may prompt the second user to instruct the first user to provide the pass phrase to the device, and the device may transmit this information for comparison. Alternatively, another device connected to the server may prompt the first user to provide their pass phrase for comparison.

Biometric verification such as finger printing may involve the first user providing a fingerprint at the reader 130, at their authenticated mobile device 115, or another device communicatively coupled to the server 150, and the fingerprint may be transmitted to the server 150 where it is compared with a previously stored fingerprint stored in the assigned user's profile. For instance, a web interface of the device carrying the reader, via the server, may prompt the second user to instruct the first user to present their hand to a device for fingerprinting. Alternatively, another device connected to the server may prompt the first user to present their hand to a device for fingerprinting.

Facial recognition, may involve taking a picture of the first user's face by a camera of the device carrying the reader 130, the authenticated mobile device 115, or another device communicatively coupled to the server 115, and transmitting the picture to the server, where the server compares the picture with one or more pictures previously stored in the assigned user's profile. For instance, the reader, via the server, may prompt the second user to take a picture of the first user and to transmit the picture to a website coupled to the server. Alternatively, another device connected to the server may prompt the first user to capture an image of their face for facial recognition.

Accelerometer verification may involve the first user engaging in a series of hand or body movements while holding the authenticated mobile device 115, or another device communicatively coupled to the server 150. This "gesture" may be created a variety of ways such as the first user making a series of recorded intermittent "knocks" on device, or tracing a simple shape or path while holding the device (e.g., this could be their initials, drawing a figure 8, etc.). The gesture may be similar to entering a pin number or lock screen shape, and serves to facilitate showing the first user in possession of the authenticated device 110 and authenticated mobile device 115 is the assigned user.

During the initial or secondary verification steps, the server 150 may send the authenticated mobile device 115 notifications about the status of the verification process underway, which may facilitate the first user's encounter with the second user. For instance, the server 150 may send a message to the authenticated mobile device 115 providing instructions for facilitating one or more verification steps, or may simply provide an indication that the second user is interfacing with the system 100 to provide comfort to the first user that the second user is engaged with their reader 130 as opposed attempting to delay the encounter between the users.

Turning to step 260, where the server confirms the first user is verified, the server sends the reader 130 confirmation that the first user identity is verified, thus providing the second user 3 assurance the first user is who they say they are. Such a confirmation may be provided in the form of a website (e.g., a unique webpage dedicated to the assigned user of the authenticated device 110), text message, and so on. For instance, the server may send a webpage or a link to a webpage that provides detailed information about the assigned and verified first user of the authenticated device 110, such as a website that displays a picture of the assigned user, their badge number, name, gender, employment location, activity status (e.g., on duty or off duty) and other information. Alternatively, the information may be a simple message that the assigned user of the authenticated device 110 is verified. The confirmation may additionally include the ability for the second user to engage with features of the system. For instance, the second user may engage in a website for rating and reporting the first user's performance during the encounter, or may request an option for recording the encounter in real-time, may request a call or video chat with a supervisor of the verified, assigned user during the encounter. In addition, the second user may be provided access to links to electronic information of second user and/or their supervisor, to forms for complaints, to forms for contacting dispatch, to surveys for analyzing the second user, and so on. In some implementations, the server 150 may automatically implement such functions for monitoring the encounter. Due to the verification of the assigned user, this may enable the system 100 to track the dialogue between the first user and the second user. In addition, the verification protocol of the present disclosure may be used to establish a secure recording from one or more of the devices including the reader, the authenticated mobile device, or another device in an area proximate the authenticated device that is transmitted to a secure data recording medium such as a memory coupled to the server 150 which may be configured as a distributed ledger (e.g., a blockchain system) or may be coupled to a distributed ledger. The verification protocol used to initiate data transmission to secure data recording medium may provide the ability to leverage authenticated devices that may otherwise be unavailable for use in secured communications due to the authenticated devices having only passive data transmission abilities (e.g., passive NFC chips with limited ability to transmit data). Moreover, verification of the assigned user according to the present disclosure further provides a confirmation that the second user 3 is interacting with an assigned user, and thus the second user's input into the system 100, e.g., via a cellular phone coupled to or serving as the reader 130, may be assigned a level of authentication in the system 100 due to their direct encounter with the assigned user. This may enable the system 100 to track a dialogue or other communications between the first user and the second user, and the verified status of the encounter may be included as data in the first user's account in the system 100. In some implementations, the verified status of the encounter may be used in data analysis for use by the server 150 and other components of the system 100 in analyzing the assigned user's performance during encounters with a group of second users.

Turning to step 270, where the server 150 is unable to confirm the first user is an assigned user of the authenticated device 110, the server 150 sends the reader 130 a message indicating the identity of the first user is not confirmed as the assigned user, may instruct the second user to take a secondary action. Secondary actions may include instructions for obtaining secondary verification information from the first user or may include instructions for contacting a peacekeeping authority (e.g., emergency services) or a supervisor of a user assigned to the authenticated device 110.

Where secondary verification information is to be obtained for the first user, this may be accomplished using the reader 130, the authenticated mobile device 115, or another device communicatively coupled to the server 150 (e.g., a separate officer's mobile device). In this case, the server 150 may receive one or more of voice verification information, biometric verification information, facial recognition information, or accelerometer verification information of the first user from one of these remote devices, and may determine whether a secondary verification match is present between the received secondary information and information previously stored in an account of the first user. When the server 150 determines a secondary verification match is present, the server may transmit for display a confirmation of the identity of the first user, and may authorize the second user to provide input into an account of the first user for storage in memory coupled to the server 150. When the server 150 determines a secondary verification match is not present, the server may notify a peacekeeping authority (e.g., may contact an emergency service such as 911 or a police station) or may notify a supervisor of a user assigned to the authenticated device 110, and in connection with such notification may provide the location of the reader 130 and thus the second user 3. The server 150 may automatically contact and provide such information on behalf of the second user, or the server may provide the second user with the option to take such steps via transmitting an inquiry to the reader 130. Upon making such contact with the peacekeeping authorities or supervisor, the server 150 may send a notification to the reader 130 of the steps taken to thereby provide the second user with an added level of protection, for instance, where the first user is an imposter.

Where the secondary actions include instructions for contacting a peacekeeping authority or a supervisor of a user assigned to the authenticated device 110, the server 150 may take the steps of notifying peacekeeping authorities or the supervisor of the assigned user as described herein.

The use of the implementations first user's authenticated device 110 and authenticated mobile device 115 with other passive communication devices is also within the scope of the present disclosure. For instance, some business campuses (schools, hospitals, universities) and municipalities use fixed passive communication devices affixed to structures where the devices contain data that may be accessible by a reader 116 of the first user's authenticated mobile device 115. The first user, for instance may be a security guard authorized to engage in encounters with members of the public (e.g., second users 3) while on patrol. In many cases, the first user's patrol may involve moving to fixed check points carrying these additional passive communication devices. The system 100 may accordingly collect information from the first user's authenticated mobile device 115 when the reader 116 is used to scan these additional fixed passive communication devices while moving from place to place during their shift. For instance, the first user may use the reader 116 to scan the fixed passive communication device to confirm the first user is present in the static location where the passive communication device is affixed (e.g., on a control panel in a boiler room). In some implementations, the first user's authenticated mobile device 115 may include an application operating on the device while moving about in order to track the first user's location continuously, or the use of the reader 116 may cause the first user's authenticated mobile device 115 to automatically open a web browser at each location in order to determine the location of the first user to verify they are in the target area of the fixed passive communication devices.

In some implementations, the first user may scan their authenticated device 110 using the reader 116 to either begin a patrol route or verify they reached a waypoint.

In some implementations, a third user, such as partner of an officer or another party to an encounter, may use their mobile device, to scan the first user's authenticated device 110, for instance to provide rating and reporting of the first user during, for example, a chance encounter, traffic stop, home visit, social event, etc., and the data may be collected by the system 100 and used for analysis.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of verifying identification information of a first user in a computing system, the method comprising:
    receiving, by a processing unit, a request from a communicatively coupled device to access information of a first user, wherein the request comprises a first set of information retrieved from a passive communication device and a second set of information related to the communicatively coupled device from which the request was sent,
    wherein the first set of information comprises identification information of the first user of the passive communication device,
    wherein the second set of information comprises a location of the communicatively coupled device;
    retrieving, by the processing unit, a location of an authenticated mobile device of the first user, wherein the authenticated mobile device and the passive communication device are separate devices from one another;
    determining, by the processing unit, whether a location match is present between the location of the communicatively coupled device and the authenticated mobile device, wherein:
    when the location match is present, transmitting, by the processing unit to the communicatively coupled device, a confirmation of the identification information of the first user, and
    when the location match is not present, transmitting, by the processing unit to the communicatively coupled device, an indication that the identification information of the first user is not confirmed, and receiving, by the processing unit, secondary verification information of the first user from at least one of the communicatively coupled device, the authenticated mobile device, or another device communicatively coupled to the processing unit.

2. The method of claim 1, wherein the passive communication device is a Near Field Communication (NFC) device, and the communicatively coupled device is a mobile phone including a chip reader and an internet browser.

3. The method of claim 1, wherein when the location match is present, the method further comprises:
receiving, by the processing unit, the secondary verification information of the first user; and
determining, by the processing unit, whether a secondary verification match is present using the received secondary verification information.

4. The method of claim 3, further comprising, prior to the step of transmitting the confirmation of the identification information of the first user, determining the secondary verification match is present.

5. The method of claim 1, wherein when the location match is not present, the method further comprises:
determining, by the processing unit, whether a secondary verification match is present using the received secondary verification information.

6. The method of claim 1, wherein the secondary verification information comprises at least one of voice verification information, biometric verification information, facial recognition information, or accelerometer verification information.

7. The method of claim 5, wherein when the processing unit determines the secondary verification match is not present, the method further comprises:
contacting, by the processing unit, a remote user; and
providing, by the processing unit, the location of the communicatively coupled device to the remote user.

8. The method of claim 7, the method further comprising notifying, by the processing unit, the communicatively coupled device of the steps of contacting and providing.

9. The method of claim 5, wherein when the processing unit determines the secondary verification match is present, the method further comprises:
transmitting, by the processing unit, a confirmation of the identification information of the first user.

10. The method of claim 1, wherein when the location match is not present, the method further comprises:
contacting, by the processing unit, a remote user; and
providing, by the processing unit, the location of the communicatively coupled device to the remote user.

11. The method of claim 10, the method further comprising notifying, by the processing unit, the communicatively coupled device of the steps of contacting and providing.

12. The method of claim 1, wherein the second set of information comprises a timestamp associated with the location of the communicatively coupled device, and the method further comprises the step of:
retrieving, by the processing unit, a timestamp of the location of the authenticated mobile device of the first user.

13. The method of claim 1, wherein the transmitted confirmation of the identification information of the first user comprises at least one of a badge number, a photograph, a name, a gender, an employment location, or an activity status of the first user.

14. One or more non-transitory computer readable media encoded with instructions which, when executed by one or more processors of a computing system, cause the computer system to perform operations comprising:
receiving a request from a communicatively coupled device to access information of a first user, wherein the request comprises a first set of information received from a passive communication device and a second set of information related to the communicatively coupled device from which the request was sent,
wherein the first set of information comprises identification information of the first user of the passive communication device,
wherein the second set of information comprises a location of the communicatively coupled device;
retrieving a location of an authenticated mobile device of the first user, wherein the authenticated mobile device and the passive communication device are separate devices from one another;
determining whether a location match is present between the location of the communicatively coupled device and the authenticated mobile device, wherein:
when the location match is present, receiving secondary verification information of the first user from at least one of the communicatively coupled device, the authenticated mobile device, or another device communicatively coupled to the one or more processors, and transmitting a confirmation of the identification information of the first user to the communicatively coupled device, and
when the location match is not present, transmitting an indication that the identification information of the first user is not confirmed to the communicatively coupled device.

15. The one or more non-transitory computer readable media of claim 14, wherein when the location match is present, the operations further comprise:
determining whether a secondary verification match is present using the received secondary verification information.

16. The one or more non-transitory computer readable media of claim 15, wherein the operations further comprise, prior to transmitting the confirmation of the identification information of the first user, determining the secondary verification match is present.

17. The one or more non-transitory computer readable media of claim 14, wherein when the location match is not present, the operations further comprise:
retrieving a secondary verification information of the first user; and
determining whether the secondary verification match is present using the received secondary information.

18. A system comprising:
one or more processors; and
one or more non-transitory computer readable media encoding instructions which, when executed by the one or more processors, cause the one or more processors to perform a method comprising:
receiving, at the one or more processors, a request from a communicatively coupled device to access information of a first user, wherein the request comprises a first set of information retrieved from a passive communication device and a second set of information related to the communicatively coupled device from which the request was sent,
wherein the first set of information comprises identification information of the first user of the passive communication device,
wherein the second set of information comprises a location of the communicatively coupled device;
retrieving a location of an authenticated mobile device of the first user, wherein the authenticated mobile device and the passive communication device are separate devices from one another;
responsive to a determination that a location match is present between the location of the communicatively coupled device and the authenticated mobile device, receiving secondary verification information of the first user from at least one of the communicatively coupled device, the authenticated mobile device, or another device communicatively coupled to the one or more processors, and transmitting, by the one or more processors, a confirmation of the identification information of the first user.

19. The system of claim 18, wherein the method further comprises:
   determining whether a secondary verification match is present using the received secondary verification information.

20. The system of claim 19, wherein the method further comprises, prior to the step of transmitting the confirmation of identification information of the first user, determining the secondary verification match is present.

\* \* \* \* \*